United States Patent
Hama et al.

(10) Patent No.: US 8,591,603 B2
(45) Date of Patent: Nov. 26, 2013

(54) METHOD FOR PRODUCING ALL SOLID LITHIUM BATTERY

(75) Inventors: Shigenori Hama, Susono (JP); Yukiyoshi Ueno, Gotenba (JP); Yasushi Tsuchida, Susono (JP); Hirofumi Nakamoto, Susono (JP); Masato Kamiya, Susono (JP); Hiroshi Nagase, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 157 days.

(21) Appl. No.: 13/059,844

(22) PCT Filed: Oct. 3, 2008

(86) PCT No.: PCT/JP2008/068071
§ 371 (c)(1),
(2), (4) Date: Feb. 18, 2011

(87) PCT Pub. No.: WO2010/038313
PCT Pub. Date: Apr. 8, 2010

(65) Prior Publication Data
US 2011/0167625 A1    Jul. 14, 2011

(51) Int. Cl.
*H01M 6/18*    (2006.01)
*H01M 10/05*   (2010.01)

(52) U.S. Cl.
USPC .......................... 29/623.1; 429/189

(58) Field of Classification Search
None
See application file for complete search history.

(56) References Cited

U.S. PATENT DOCUMENTS

| | | | | |
|---|---|---|---|---|
| 6,300,013 | B1 * | 10/2001 | Yamada et al. | 429/231.8 |
| 2007/0175020 | A1 * | 8/2007 | Nagata et al. | 29/623.3 |
| 2007/0259271 | A1 | 11/2007 | Nanno et al. | |

FOREIGN PATENT DOCUMENTS

| | | |
|---|---|---|
| JP | A-6-279050 | 10/1994 |
| JP | A-2002-109955 | 4/2002 |
| JP | A-2006-151725 | 6/2006 |
| JP | A-2007-5279 | 1/2007 |
| JP | A-2007-227362 | 9/2007 |
| JP | A-2007-273214 | 10/2007 |
| JP | A-2008-287970 | 11/2008 |
| WO | WO 2004/106232 A1 | 12/2004 |

OTHER PUBLICATIONS

Minami et al., "Structure and properties of the 70Li2S • (30-x) P2S5 • xP2O5 oxysulfide glasses and glass-ceramics," 2008, Journal of Non-Crystalline Solids, vol. 354, pp. 370-373.*
Yamane et al.; "Crystal Structure of superionic conductor, $Li_7P_3S_{11}$;" *Solid State Ionics;* 2007; pp. 1163-1167; vol. 178; Elsevier B.V.
Minami et al.; Structure and properties of the $70LI_2S • (30-\chi)P_2S_5 • \chi P_2O_5$ oxysulfide glasses and glass-ceramics; Journal of Non-Crystalline Solids; 2008; pp. 370-373; vol. 354; Elsevier B.V.
International Search Report dated Dec. 16, 2008 in corresponding International Application No. PCT/JP2008/068071 (with translation).

* cited by examiner

*Primary Examiner* — Ula C Ruddock
*Assistant Examiner* — Matthew Van Oudenaren
(74) *Attorney, Agent, or Firm* — Oliff & Berridge, PLC

(57) ABSTRACT

The main object of the present invention is to provide a method for producing an all solid lithium battery, capable of easily performing dew point control in a battery assembly step. The present invention solves the above-mentioned problems by providing a method for producing an all solid lithium battery, comprising the steps of: preparing a material composition by adding $Li_2S$, $P_2S_5$, and $P_2O_5$ so as to satisfy a relation of $(Li_2S)/(P_2S_5+P_2O_5)<3$ on a molar basis, synthesizing a sulfide solid electrolyte from the above-mentioned material composition by a vitrification means, and assembling an all solid lithium battery in an atmosphere having a dew-point temperature of −60° C. or more while using the above-mentioned sulfide solid electrolyte.

7 Claims, 3 Drawing Sheets

METHOD FOR PRODUCING ALL SOLID LITHIUM BATTERY

TECHNICAL FIELD

The present invention relates to a method for producing an all solid lithium battery, capable of easily performing dew point control in the battery assembly step.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric vehicle or a hybrid automobile has been advanced also in the technical industries such as the automobile industry. A lithium battery has been presently attracting attentions from the viewpoint of a high energy density among various kinds of batteries.

Organic liquid electrolyte having a flammable organic solvent as a solvent thereof is used for a presently commercialized lithium battery, so that the installation of a safety device for restraining temperature rise during a short circuit and the improvement in structure and material for preventing the short circuit are necessary therefor.

On the contrary, an all solid lithium battery all-solidified by replacing the liquid electrolyte with a solid electrolyte has the advantages of attaining the simplification of the safety device and being excellent in production cost and productivity for the reason that the flammable organic solvent is not used in the battery. A sulfide solid electrolyte has been conventionally known as a solid electrolyte used for such an all solid lithium battery.

However, the problem is that the sulfide solid electrolyte is low in stability against moisture. Thus, a method for synthesizing the sulfide solid electrolyte on the conditions of less moisture has been conventionally known. For example, a method for synthesizing the sulfide solid electrolyte, in which heating and melting are performed in an inert gas stream with a moisture amount of 100 ppm or less, is disclosed in Patent Document 1.

Among the sulfide solid electrolytes, $Li_7P_3S_{11}$ is so high in lithium ion conductivity as to be expected as a useful material for an all solid lithium battery. A crystal structure of $Li_7P_3S_{11}$ is disclosed in Nonpatent Document 1; specifically, a crystal structure, in which a $P_2S_7$ unit including cross-linking sulfur (a unit represented by the structural formula B mentioned below) and a $PS_4$ unit having no cross-linking sulfur (a unit represented by the structural formula C mentioned below) are arrayed at a ratio of 1:1 is disclosed therein. $Li_7P_3S_{11}$ may be synthesized by using a material composition prepared so as to satisfy a relation of $Li_2S:P_2S_5=70:30$ on a molar basis.

The synthesizing of the sulfide solid electrolyte by using a material composition prepared so as to satisfy a relation of $Li_2S:P_2S_5:P_2O_5=70:30-x:x$ on a molar basis is disclosed in Nonpatent Document 2. This technique allows the sulfide solid electrolyte with electrical stability improved.

Patent Document 1: Japanese Patent Application publication No. 6-279050
Nonpatent Document 1: H. Yamane et al., "Crystal structure of a superionic conductor $Li_7P_3S_{11}$", Solid State Ionics 178 (2007) 1163-1167
Nonpatent Document 2: K. Minami et al., "Structure and properties of the $70Li_2S-(30-x)P_2S_5-xP_2O_5$ oxysulfide glasses and glass-ceramics", Journal of Non-Crystalline Solids 354 (2008) 370-373

DISCLOSURE OF THE INVENTION

Problems to be Solved by the Invention

In the case of producing an all solid lithium battery using a sulfide solid electrolyte, dew point control in a battery assembly step has conventionally needed to be performed extremely strictly for preventing lithium ion conductivity of the sulfide solid electrolyte from deteriorating due to moisture. Specifically, the battery needs to be usually assembled in an atmosphere having a dew-point temperature of $-70°$ C. or less (a moisture content of 2.58 ppm (capacity) or less), and the problem is that dew point control is difficult.

The present invention has been made in view of the above-mentioned problem, and the main object thereof is to provide a method for producing an all solid lithium battery, capable of easily performing dew point control in a battery assembly step.

Means for Solving the Problem

Through earnest studies for solving the above-mentioned problem, the inventors of the present invention have found out that a sulfide solid electrolyte using a material composition obtained by adding $Li_2S$, $P_2S_5$, and $P_2O_5$ so as to satisfy a relation of $(Li_2S)/(P_2S_5+P_2O_5)<3$ on a molar basis, is less likely to deteriorate its lithium ion conductivity even in an atmosphere with a high dew-point temperature. The present invention has been made based on such findings.

According to the invention, there is provided a method for producing an all solid lithium battery, comprising the steps of: preparing a material composition by adding $Li_2S$, $P_2S_5$, and $P_2O_5$ so as to satisfy a relation of $(Li_2S)/(P_2S_5+P_2O_5)<3$ on a molar basis; synthesizing a sulfide solid electrolyte from the material composition by a vitrification means; and assembling an all solid lithium battery in an atmosphere having a dew-point temperature of $-60°$ C. or more while using the sulfide solid electrolyte.

According to the present invention, a sulfide solid electrolyte having a $P_2S_6O$ unit may be synthesized by using a material composition such that $P_2O_5$ is further added in addition to $Li_2S$ and $P_2S_5$. The $P_2S_6O$ unit is so high in stability against moisture compare to that of a $P_2S_7$ unit as to be capable of restraining lithium ion conductivity of the sulfide solid electrolyte from deteriorating even in an atmosphere with a high dew-point temperature. Thus, the facilitation of dew point control may be attained.

According to the invention, the battery assembly step is preferably performed in an atmosphere having a dew-point temperature of $-30°$ C. or less. Thus, the lithium ion conductance by moisture may be sufficiently restrained from deteriorating.

According to the invention, the sulfide solid electrolyte is preferably used as a solid electrolyte membrane disposed between a cathode active material layer and an anode active material layer. Thereby, the all solid lithium battery excellent in lithium ion conductivity may be obtained.

According to the invention, the vitrification means is preferably a mechanical milling. Thereby, a treatment at normal temperature may be performed to simplify the production processes.

According to the invention, the material composition preferably satisfies a relation of $(Li_2S)/(P_2S_5+P_2O_5)=7/3$ on a molar basis. Thereby, sulfide solid electrolyte excellent in lithium ion conductivity may be obtained.

According to the invention, the material composition preferably satisfies a relation of $(P_2O_5)/(Li_2S+P_2S_5+P_2O_5) \leq 10$ on a molar basis. Stability against moisture is improved while the lithium ion conductance may be kept high.

Effect of the Invention

The present invention produces the effect of being capable of easily performing dew point control in the battery assembly step.

DESCRIPTION OF REFERENCE NUMERALS

Figure 1:
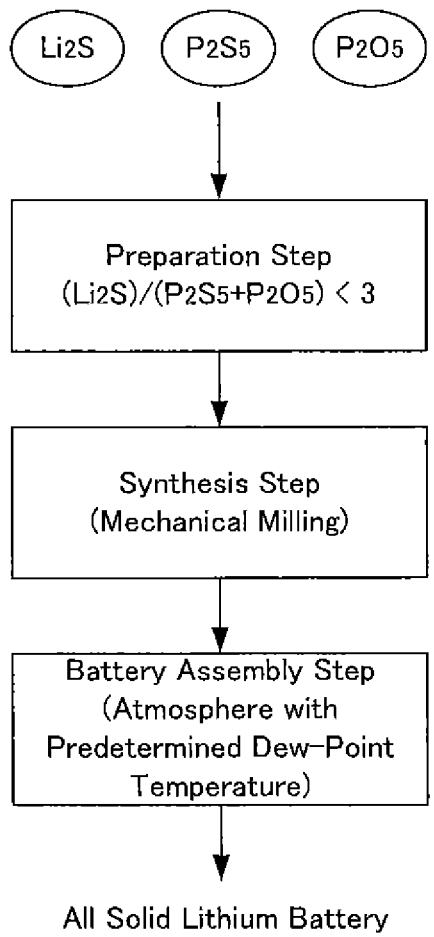
FIG. 1 is an explanatory view explaining an example of a method for producing an all solid lithium battery of the present invention.

1 . . . anode current collector
2 . . . anode active material layer
3 . . . solid electrolyte membrane
4 . . . cathode active material layer
5 . . . cathode current collector
10 . . . power generating element of all solid lithium battery

BEST MODE FOR CARRYING OUT THE INVENTION

A method for producing an all solid lithium battery of the present invention is hereinafter described in detail.

A method for producing an all solid lithium battery of this invention comprises the steps of: preparing a raw material composition by adding $Li_2S$, $P_2S_5$, and $P_2O_5$ so as to satisfy a relation of $(Li_2S)/(P_2S_5+P_2O_5)<3$ on a molar basis; synthesizing a sulfide solid electrolyte from the material composition by a vitrification means; and assembling an all solid lithium battery in an atmosphere having a dew-point temperature of −60° C. or more while using the sulfide solid electrolyte.

FIG. 1 is an explanatory view explaining an example of a method for producing an all solid lithium battery of the present invention. In FIG. 1, $Li_2S$, $P_2S_5$, and $P_2O_5$ are first prepared as a starting material. In addition, this starting material is added at a predetermined ratio to prepare a material composition (preparation step). Next, a sulfide solid electrolyte made of sulfide glass is synthesized from the material composition by a vitrification means (such as a mechanical milling) (synthesis step). In the present invention, sulfide glass is burned into sulfide glass ceramics, which may be used as a sulfide solid electrolyte. Next, an all solid lithium battery is assembled in an atmosphere with a predetermined dew-point temperature while using the obtained sulfide solid electrolyte (battery assembly step).

Also in the present invention, the sulfide solid electrolyte having units represented by the following structural formula A to structural formula C is obtained by the above-mentioned synthesis step. Specifically, the sulfide solid electrolyte having a $P_2S_6O$ unit represented by the structural formula A (occasionally referred to simply as 'a $P_2S_6O$ unit'), a $P_2S_7$ unit represented by the structural formula B (occasionally referred to simply as 'a $P_2S_7$ unit') and a $PS_4$ unit represented by the structural formula C (occasionally referred to simply as 'a $PS_4$ unit') is obtained. This sulfide solid electrolyte usually has a Li ion as a counter of each of the units.

[Chemical Formula 1]

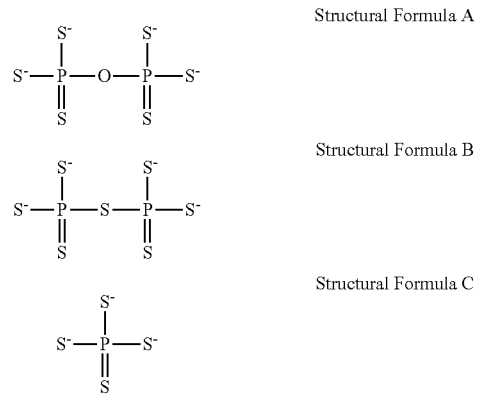

According to the present invention, the sulfide solid electrolyte having the $P_2S_6O$ unit may be synthesized by using a material composition such that $P_2O_5$ is further added in addition to $Li_2S$ and $P_2S_5$. The $P_2S_6O$ unit is so high in stability against moisture compare to that of the $P_2S_7$ unit as to be capable of restraining lithium ion conductivity of the sulfide solid electrolyte from deteriorating even in an atmosphere with a high dew-point temperature. Thus, the dew point control may be facilitated. In addition, the battery may be assembled in an atmosphere with such a high dew-point temperature that costs for maintaining dew-point temperature may be also decreased. In particular, in the case of performing battery assembly step, a large working space is usually required so that the facilitation of dew point control and the decrease of costs for maintaining dew-point temperature are important.

Although it is known that conventional $Li_7P_3S_{11}$ (a compound containing the $P_2S_7$ unit and the $PS_4$ unit at 1:1) is low in stability against moisture, the principle thereof has not been clarified. Through earnest studies of the inventors of the present invention, as described in the Reference Example mentioned below, it was confirmed that the $P_2S_7$ unit reacted preferentially with moisture compare to the case of the $PS_4$ unit. In addition, in consideration of the structure of the $P_2S_7$ unit, it is conceived that sulfur located in a cross-linking portion reacts with moisture in the atmosphere to cause hydrogen sulfide. They have completed the present invention by conceiving from these findings that the $P_2S_6O$ unit, in which cross-linking sulfur of the $P_2S_7$ unit is substituted with oxygen, is high in stability against moisture. The above-mentioned Nonpatent Document 1 and Nonpatent Document 2 offer no descriptions and suggestions about stability of the sulfide solid electrolyte against moisture.

A method for producing an all solid lithium battery of the present invention is hereinafter described by each step.

1. Preparation Step

Preparation step in the present invention is a step of adding $Li_2S$, $P_2S_5$, and $P_2O_5$ so as to satisfy a relation of $(Li_2S)/(P_2S_5+P_2O_5)<3$ on a molar basis to prepare a material composition.

In the present invention, $Li_2S$, $P_2S_5$, and $P_2O_5$ are used as a starting material for the sulfide solid electrolyte. Preferably, each of $Li_2S$, $P_2S_5$, and $P_2O_5$ contains fewer impurities. Thereby, it becomes possible to restrain side reaction. Examples of a method for synthesizing $Li_2S$ used for the present invention include a method described in Japanese Patent Application Publication No. 7-330312. In addition, $Li_2S$ is preferably purified by using a method described in WO2005/040039. Commercially available $P_2S_5$ and $P_2O_5$ may be used for the present invention.

In the present invention, $Li_2S$, $P_2S_5$, and $P_2O_5$ are added so as to satisfy a relation of $(Li_2S)/(P_2S_5+P_2O_5)<3$ on a molar basis. This relation is derived from the following consideration. That is to say, in the case of producing $Li_2S-P_2S_5$ sulfide solid electrolyte, when $Li_2S$ and $P_2S_5$ are added so as to satisfy a relation of $Li_2S$: $P_2S_5=75:25$ (=3:1) on a molar basis, only the $PS_4$ unit having no cross-linking sulfur is produced and the $P_2S_7$ unit having cross-linking sulfur is not produced. Thus, a relation of $(Li_2S)/(P_2S_5)<3$ needs to be satisfied for producing the $P_2S_7$ unit. On the other hand, in the present invention, the $P_2S_5O$ unit having a structure such that cross-linking sulfur of the $P_2S_7$ unit is substituted with oxygen is produced by substituting part of $P_2S_5$ to be used with $P_2O_5$. In consideration of these, the relation of $(Li_2S)/(P_2S_5+P_2O_5)<3$ was determined for producing the $P_2S_6O$ unit.

In the present invention, the material composition preferably satisfies a relation of $1\leq(Li_2S)/(P_2S_5+P_2O_5)<3$ on a molar basis, and more preferably satisfies a relation of $1.5\leq(Li_2S)/(P_2S_5+P_2O_5)<3$. In particular, in the present invention, the material composition preferably satisfies a relation of $(Li_2S)/(P_2S_5+P_2O_5)=7/3$ on a molar basis. Thereby, the sulfide solid electrolyte excellent in lithium ion conductivity may be obtained.

In the present invention, the added amount of $P_2O_5$ with respect to the total sum of the added amount of $Li_2S$, $P_2S_5$, and $P_2O_5$ may be represented by $(Li_2S)/(Li_2S+P_2S_5+P_2O_5)$. In the present invention, the material composition preferably satisfies a relation of $(P_2O_5)/(Li_2S+P_2S_5+P_2O_5)\leq10$ on a molar basis, more preferably satisfies a relation of $(P_2O_5)/(Li_2S+P_2S_5+P_2O_5)\leq8$, and far more preferably satisfies a relation of $(P_2O_5)/(Li_2S+P_2S_5+P_2O_5)\leq6$. The reason is that too high added ratio of $P_2O_5$ may deteriorate lithium ion conductivity. On the other hand, the material composition preferably satisfies a relation of $0.5\leq(P_2O_5)/(Li_2S+P_2S_5+P_2O_5)$ on a molar basis, more preferably satisfies a relation of $1.0\leq(P_2O_5)/(Li_2S+P_2S_5+P_2O_5)$, and far more preferably satisfies a relation of $1.5\leq(P_2O_5)/(Li_2S+P_2S_5+P_2O_5)$. The reason is that too low added ratio of $P_2O_5$ may be incapable of improving stability against moisture.

As described above, the material composition preferably satisfies a relation of $(Li_2S)/(P_2S_5+P_2O_5)=7/3$ on a molar basis. In this case, the composition of each material may be described as $Li_2S:P_2S_5:P_2O_5=70:30-x:x$ on a molar basis. As described above, x is preferably 10 or less, more preferably 8 or less, and far more preferably 6 or less. Similarly, x is preferably 0.5 or more, more preferably 1.0 or more, and far more preferably 1.5 or more.

The ratio of $Li_2S$, $P_2S_5$, and $P_2O_5$ in the material composition is not particularly limited as long as it satisfies the above-mentioned relation. The content of $Li_2S$ contained in the material composition is preferably within a range of 68 mol % to 74 mol %, for example. The content of $P_2S_5$ contained in the material composition is preferably within a range of 16 mol % to 31.5 mol %, for example. The content of $P_2O_5$ contained in the material composition is, for example, preferably 0.5 mol % or more, more preferably 1 mol % or more, and far more preferably 1.5 mol % or more. Similarly, the content of $P_2O_5$ is, for example, preferably 10 mol % or less, more preferably 8 mol % or less, and far more preferably 6 mol % or less.

The material composition in the present invention may contain only $Li_2S$, $P_2S_5$, and $P_2O_5$, or may contain an additive in addition to $Li_2S$, $P_2S_5$, and $P_2O_5$. Examples of the additive include a sulfide of at least one kind selected from the group consisting of $Al_2S_3$, $B_2S_3$, $GeS_2$ and $SiS_2$. The addition of such a sulfide allows more stable sulfide glass. Other examples of the above-mentioned additive include ortho-oxo acid lithium of at least one kind selected from the group consisting of $Li_3PO_4$, $Li_4SiO_4$, $Li_4GeO_4$, $Li_3BO_3$ and $Li_3AlO_3$. The addition of such ortho-oxo acid lithium allows more stable sulfide glass. The material composition in the present invention may contain both the sulfide and the ortho-oxo acid lithium. The added amount of the additive is preferably determined appropriately in accordance with uses.

2. Synthesis Step

Next, synthesis step in the present invention is described. Synthesis step in the present invention is the step of synthesizing a sulfide solid electrolyte from the above-mentioned material composition by a vitrification means. The sulfide solid electrolyte made of sulfide glass is usually obtained by a vitrification means. In the present invention, sulfide glass is burned into sulfide glass ceramics, which may be used as the sulfide solid electrolyte.

A vitrification means in the present invention is not particularly limited if it is a means capable of synthesizing sulfide glass from the material composition; examples thereof include a mechanical milling and a melt extraction, and the mechanical milling is preferable among them. The reason is that a treatment at normal temperature may be performed to simplify the production processes.

In the present invention, sulfide glass is preferably synthesized from the material composition in an inert gas atmosphere. The reason is that moisture and oxygen react easily with a starting material. Examples of the inert gas include argon and nitrogen.

The mechanical milling is not particularly limited if it provides mechanical energy to the material composition; examples thereof include a ball mill, a turbo mill, a mechanofusion and a disk mill, and the ball mill is preferable among them and a planetary ball mill is particularly preferable. The reason is that the planetary ball mill is so versatile as to efficiently provide a sulfide glass.

Various kinds of the conditions of the above-mentioned mechanical milling are preferably determined so as to allow the desired sulfide glass, and are preferably selected properly in accordance with kinds of the mechanical milling. For example, in the case of synthesizing sulfide glass by the planetary ball mill, the material composition and a grinding ball are usually added in a pot and treated at predetermined number of revolutions and time. Generally, larger number of revolutions brings higher production rate of sulfide glass, and longer treating time brings higher conversion ratio of the material into sulfide glass. The number of revolutions in performing the planetary ball mill is preferably within a range of 200 rpm to 500 rpm and within a range of 300 rpm to 400 rpm, above all, for example. The treating time in performing the planetary ball mill is preferably within a range of 0.5 hour to 100 hours and within a range of 10 hours to 40 hours, above all, for example.

As described above, in the present invention, sulfide glass is burned into sulfide glass ceramics, which may be used as the sulfide solid electrolyte. The temperature for burning treatment is not particularly limited if it is such a temperature as to provide the desired sulfide glass ceramics; preferably, within a range of 150° C. to 360° C. and within a range of 200° C. to 350° C., above all, for example. The reason is that too low temperature for burning treatment may not reach glass transition temperature of sulfide glass to cause no progress of crystallization, while too high temperature for burning treatment may not form the desired crystal structure. The time for burning treatment is preferably within a range of 1 minute to 2 hours and within a range of 10 minutes to 1 hour, above all, for example.

In the present invention, sulfide glass is preferably burned in an inert gas atmosphere. The reason is to prevent the oxidation and the like of sulfide glass ceramics. Examples of the inert gas include argon and nitrogen. Examples of an apparatus for performing a burning treatment include a general burning furnace.

3. Battery Assembly Step

Next, the battery assembly step in the present invention is described. The battery assembly step in the present invention is the step of assembling an all solid lithium battery in an atmosphere having a dew-point temperature of −60° C. or more while using the above-mentioned sulfide solid electrolyte.

The atmosphere in the battery assembly step is such that a dew-point temperature is preferably −55° C. or more, and more preferably −50° C. or more. Thereby, it becomes possible to sufficiently restrain lithium ion conductivity from deteriorating due to moisture even in an atmosphere with a high dew-point temperature. On the other hand, the atmosphere in the battery assembly step is such that a dew-point temperature is preferably −20° C. or less, more preferably −30° C. or less, far more preferably −35° C. or less, and particularly preferably −40° C. or less. The reason is to be capable of sufficiently restraining lithium ion conductivity from deteriorating due to moisture. In the present invention, the dew-point temperature may be measured by a dew-point recorder (such as an optional dew-point recorder of a vacuum glove box (MDB-2B™), manufactured by MIWA MFG CO., LTD).

A relation between dew-point temperature and moisture content in gaseous phase (in air) is shown below. The moisture content of an atmosphere in the battery assembly step is preferably a content range corresponding to a range of the above-mentioned dew-point temperature.

TABLE 1

| Dew-Point Temperature ° C. | Moisture Content in Gaseous Phase (in air) ppm(capacity) |
|---|---|
| −70 | 2.58 |
| −68 | 3.47 |
| −66 | 4.63 |
| −64 | 6.15 |
| −62 | 8.12 |
| −60 | 10.7 |
| −58 | 13.9 |
| −56 | 18.1 |
| −54 | 23.5 |
| −52 | 30.3 |
| −50 | 38.8 |

TABLE 1-continued

| Dew-Point Temperature ° C. | Moisture Content in Gaseous Phase (in air) ppm(capacity) |
|---|---|
| −48 | 49.6 |
| −46 | 63.1 |
| −44 | 88.8 |
| −42 | 100.8 |
| −40 | 126.7 |
| −38 | 158.6 |
| −36 | 197.7 |
| −34 | 245.7 |
| −32 | 304.0 |
| −30 | 375.1 |
| −28 | 461.1 |
| −26 | 565.0 |
| −24 | 690.0 |
| −22 | 840.0 |
| −20 | 1020 |
| −18 | 1224 |
| −16 | 1489 |
| −14 | 1791 |
| −12 | 2149 |
| −10 | 2570 |
| −8 | 3067 |

The upper limit of dew-point temperature of the atmosphere in the battery assembly step may be determined by a 10-hour preservation test described in the Examples mentioned below. A preliminary test is performed at various dew-point temperatures to measure dew-point temperature, where lithium ion conductance after the 10-hour preservation test becomes $1 \times 10^{-3}$ (S·cm$^{-1}$), and this dew-point temperature may be regarded as the upper limit of dew-point temperature of the atmosphere in the battery assembly step.

The atmosphere in the battery assembly step is usually an inert gas atmosphere. Examples of the inert gas to be used include argon and nitrogen.

In the present invention, an all solid lithium battery is assembled while using the sulfide solid electrolyte. The sulfide solid electrolyte may be used as a solid electrolyte membrane disposed between a cathode active material layer and an anode active material layer, or as a solid electrolyte material added to a cathode active material layer and/or an anode active material layer. Among them, in the present invention, the sulfide solid electrolyte is preferably used as a solid electrolyte membrane. Thereby, an all solid lithium battery excellent in lithium ion conductivity may be obtained.

In the battery assembly step, a power generating element is usually formed by using a cathode current collector, a cathode active material layer, an anode current collector and an anode active material layer in addition to the above-mentioned sulfide solid electrolyte. A method for forming a power generating element is the same as a general method and not particularly limited; examples thereof include a method for sequentially performing compression molding so as to obtain a composition of anode current collector/anode active material layer/solid electrolyte membrane/cathode active material layer/cathode current collector. The above-mentioned power generating element may be formed in such a manner that an anode active material layer, a solid electrolyte membrane and a cathode active material layer are each molded into pellets and compressed.

Figure 2:
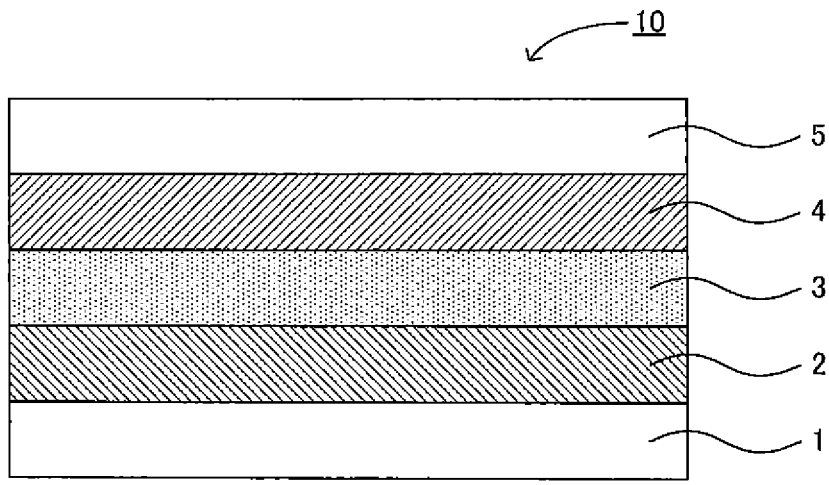
FIG. 2 is a schematic cross-sectional view showing an example of a power generating element of an all solid lithium battery obtained by the present invention.

FIG. 2 is a schematic cross-sectional view showing an example of a power generating element of an all solid lithium battery obtained by the present invention. A power generating element 10 shown in FIG. 2 has an anode current collector 1, an anode active material layer 2, a solid electrolyte membrane 3 using the sulfide solid electrolyte, a cathode active material layer 4 and a cathode current collector 5.

In the present invention, the solid electrolyte membrane is preferably formed by using the above-mentioned sulfide solid electrolyte. The thickness of the solid electrolyte membrane is preferably within a range of 0.1 μm to 1000 μm and within a range of 0.1 μm to 300 μm, above all, for example.

The cathode active material layer used for the present invention has at least a cathode active material. Examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. The cathode active material layer may also contain a conductive material in order to improve electrical conductivity. Examples of the conductive material include acetylene black and carbon fiber. The cathode active material layer may further contain a solid electrolyte in order to improve lithium ion conductivity. The thickness of the cathode active material layer is within a range of 1 μm to 100 μm, for example.

The cathode current collector used for the present invention is not particularly limited if it has the function of performing current collection of the cathode active material layer. Examples of a material for the above-mentioned cathode current collector include SUS. Examples of a shape of the above-mentioned cathode current collector include a foil shape and a mesh shape.

The anode active material layer used for the present invention has at least an anode active material. Examples of the anode active material include a metal active material and a carbon active material. Examples of the metal active material include In, Al, Si, Sn and alloy thereof. On the other hand, examples of the carbon active material include mesocarbon microbeads (MCMB), high orientation property graphite (HOPG), hard carbon and soft carbon. The anode active material layer may also contain the above-mentioned conductive material and solid electrolyte. The anode active material layer used for the present invention may be a metal film of the metal active material, or such as to subject a powder of the anode active material to compression molding. The thickness of the anode active material layer is within a range of 1 μm to 100 μm, for example.

The anode current collector used for the present invention is not particularly limited if it has the function of performing current collection of the anode active material layer. Examples of a material for the above-mentioned anode current collector include SUS. Examples of a shape of the above-mentioned anode current collector include a foil shape and a mesh shape.

In the present invention, an all solid lithium battery is generally assembled by storing the above-mentioned power generating element in a battery case. The material and shape of the battery case are the same as a general all solid lithium battery. In the present invention, the above-mentioned power generating element may be formed in a hollow part of an insulating ring. An all solid lithium battery obtained by the present invention may be a primary battery or a secondary battery. Examples of uses for an all solid lithium battery obtained by the present invention include a car-mounted battery.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Synthesis Example 1

Lithium sulfide crystal ($Li_2S$), phosphorus pentasulfide ($P_2S_5$), and diphosphorus pentoxide ($P_2O_5$) were prepared as a starting material. These powders were weighed at a ratio of $Li_2S:P_2S_5: P_2O_5=70:26:4$ (molar basis) in a glove box under an argon atmosphere, and projected into a pot made of zirconia. In addition, six grinding balls made of zirconia with 4=15 mm were projected into the pot made of zirconia with a capacity of 45 cc, and sealed completely. Next, the pot made of zirconia was fitted up in a planetary ball mill machine and subjected to the mechanical milling at a rotational speed of 370 rpm for 20 hours to obtain powdery sulfide glass. As a result of measuring the obtained sulfide glass by an X-ray diffraction (XRD) method, it was confirmed that the peak of $Li_2S$ disappeared and vitrification progressed. Next, the obtained sulfide glass was subjected to burning treatment on the conditions of 280° C. and 1 hour while flowing Ar gas to obtain a sulfide solid electrolyte composed of sulfide glass ceramics.

Synthesis Example 2

A sulfide-based solid electrolyte material was obtained in the same manner as Synthesis Example 1 except for determining at $Li_2S: P_2S_5: P_2O_5=70:28:2$ (molar basis). As a result of measuring the sulfide glass obtained during the synthesis by an X-ray diffraction (XRD) method, it was confirmed that the peak of $Li_2S$ disappeared and vitrification progressed.

Synthesis Example 3

Ti sulfide-based solid electrolyte material was obtained in the same manner as Synthesis Example 1 except for determining at $Li_2S:P_2S_5: P_2O_5=70:24:6$ (molar basis). As a result of measuring the sulfide glass obtained during the synthesis by an X-ray diffraction (XRD) method, it was confirmed that the peak of $Li_2S$ disappeared and vitrification progressed.

Synthesis Example 4

A sulfide-based solid electrolyte material was obtained in the same manner as Synthesis Example 1 except for determining at $Li_2S: P_2S_5: P_2O_5=70:20:10$ (molar basis). As a result of measuring the sulfide glass obtained during the synthesis by an X-ray diffraction (XRD) method, it was confirmed that the peak of $Li_2S$ disappeared and vitrification progressed.

Comparative Synthesis Example

A sulfide solid electrolyte was obtained in the same manner as Synthesis Example 1 except for determining at $Li_2S: P_2S_5=70:30$ (molar basis) without using $P_2O_5$.

Example 1-1

A test such that the sulfide solid electrolyte obtained in Synthesis Example 1 was preserved for 10 hours in a glove box under an Ar atmosphere having a dew-point temperature of −20° C. was performed.

Example 1-2

A test such that the sulfide solid electrolyte obtained in Synthesis Example 1 was preserved for 10 hours in a glove box under an Ar atmosphere having a dew-point temperature of −30° C. was performed.

Example 1-3

A test such that the sulfide solid electrolyte obtained in Synthesis Example 1 was preserved for 10 hours in a glove box under an Ar atmosphere having a dew-point temperature of −40° C. was performed.

Example 1-4

A test such that the sulfide solid electrolyte obtained in Synthesis Example 1 was preserved for 10 hours in a glove box under an Ar atmosphere having a dew-point temperature of −60° C. was performed.

Comparative Example 1-1

A test such that the sulfide solid electrolyte obtained in Synthesis Example 1 was preserved for 10 hours in a glove box under an Ar atmosphere having a dew-point temperature of −70° C. was performed.

Comparative Example 1-2

A test such that the sulfide solid electrolyte obtained in Synthesis Example 1 was preserved for 10 hours in a glove box under an Ar atmosphere having a dew-point temperature of −80° C. was performed.

Comparative Example 1-3

A test such that the sulfide solid electrolyte obtained in Comparative Synthesis Example was preserved for 10 hours in a glove box under an Ar atmosphere having a dew-point temperature of −20° C. was performed.

Comparative Example 1-4

A test such that the sulfide solid electrolyte obtained in Comparative Synthesis Example was preserved for 10 hours in a glove box under an Ar atmosphere having a dew-point temperature of −30° C. was performed.

Comparative Example 1-5

A test-such that the sulfide solid electrolyte obtained in Comparative Synthesis Example was preserved for 10 hours in a glove box under an Ar atmosphere having a dew-point temperature of −40° C. was performed.

Comparative Example 1-6

A test such that the sulfide solid electrolyte obtained in Comparative Synthesis Example was preserved for 10 hours in a glove box under an Ar atmosphere having a dew-point temperature of −60° C. was performed.

Comparative Example 1-7

A test such that the sulfide solid electrolyte obtained in Comparative Synthesis Example was preserved for 10 hours in a glove box under an Ar atmosphere having a dew-point temperature of −70° C. was performed.

Comparative Example 1-8

A test such that the sulfide solid electrolyte obtained in Comparative Synthesis Example was preserved for 10 hours in a glove box under an Ar atmosphere having a dew-point temperature of −80° C. was performed.

[Evaluations 1]

Figure 3:
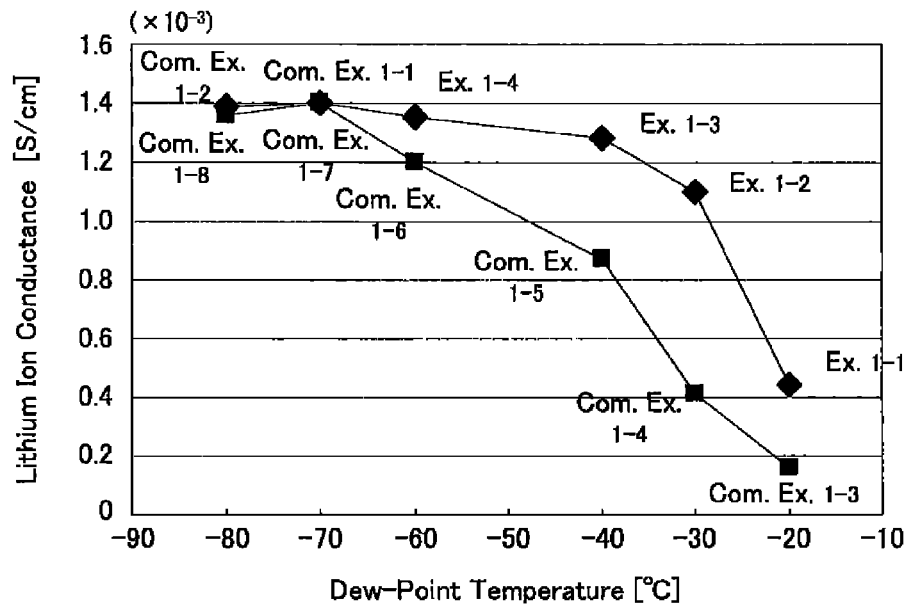
FIG. 3 is a measurement result of lithium ion conductance.

The lithium ion conductance of the respective sulfide solid electrolyte obtained in Examples 1-1 to 1-4 and Comparative Examples 1-1 to 1-8 was evaluated. First, after finishing the test, the sulfide solid electrolyte was weighed by 5.1 mg in the glove box. Next, the sulfide solid electrolyte was subject to compression molding at a pressure of 5.1 t/cm² to thereby obtain pellets with ϕ-10 mm. Next, the lithium ion conductance was measured by an alternating current impedance method while using these pellets. The measurement conditions are shown below.
(Measurement Conditions)
Electrode: SUS304
Impedance measurement system: SOLARTRON 1260™ (manufactured by Solartron)
Impressed voltage: 5 mV
Measuring frequency: 0.01 MHz to 10 MHz The obtained results are shown in FIG. 3. As shown in FIG. 3, in Comparative Examples without using $P_2O_5$ (Comparative Examples 1-3 to 1-8), the lithium ion conductance was approximately the same in the case of a dew-point temperature of −70° C. or less (Comparative Examples 1-7 and 1-8). However, as shown in Comparative Examples 1-3 to 1-6, it was confirmed that the lithium ion conductance decreased abruptly when the dew-point temperature became higher than −70° C. The reason is that the sulfide solid electrolyte deteriorated due to moisture in the glove box. Thus, the battery has conventionally needed to be assembled in an atmosphere having a dew-point temperature of −70° C. or less.

On the contrary, in the system with the use of $P_2O_5$ (Examples 1-1 to 1-4 and Comparative Examples 1-1 and 1-2), the lithium ion conductance was approximately the same in the case of a dew-point temperature of −70° C. or less (Comparative Examples 1-1 and 1-2). However, as shown in Examples 1-1 to 1-4, the lithium ion conductance decreased gently even when the dew-point temperature became higher than −70° C. It is conceived that the reason is that the sulfide solid electrolyte used in Examples has not only the $P_2S_7$ unit but also the $P_2S_6O$ unit high in stability against moisture. Thus, it becomes possible to restrain the lithium ion conductance from deteriorating even in an atmosphere with a high dew-point temperature. As a result, the facilitation of dew point control may be attained, and costs for maintaining the desired dew-point temperature may be decreased. In Example 1-1, it was possible to keep the lithium ion conductance high compared to that of Comparative Example 1-3. It is conceived that this is also the influence of the $P_2S_6O$ unit.

Example 2

An evaluation cell was produced by using the sulfide solid electrolyte obtained in Example 1-3. The production of the evaluation cell was performed in a glove box under an Ar atmosphere having a dew-point temperature of −40° C. in the same manner as the synthesis of the sulfide solid electrolyte. First, an anode active material (graphite) was pressed by using a pressing machine to form an anode active material layer. Next, the sulfide solid electrolyte obtained in Example 1-2 was added and pressed on a surface of the anode active material layer to thereby form a solid electrolyte membrane. Next, a cathode active material (LiCoO$_2$) was added and pressed on a surface of the solid electrolyte membrane to thereby form a cathode active material layer. Thus, a laminated body of the anode active material layer/solid electrolyte membrane/cathode active material layer was obtained. In addition, both sides of this laminated body were held between current collectors (SUS) to obtain the evaluation cell.

[Evaluations 2]

Figure 4:
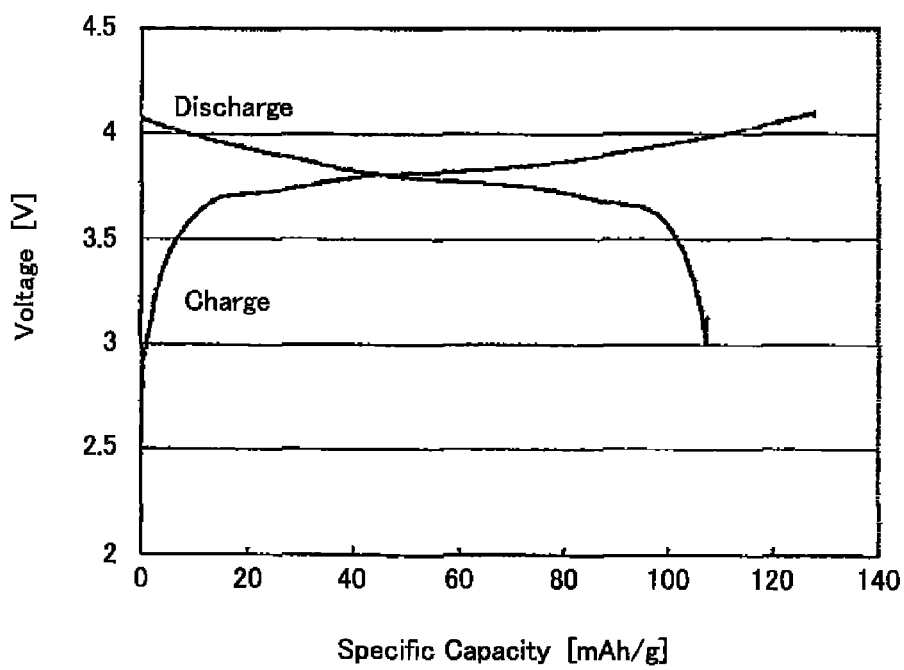
FIG. 4 is a charge-discharge curve of an evaluation cell produced in Example 2.

A charge-discharge test was performed by using the evaluation cell obtained in Example 2 at an electric current of 127 mA/cm$^2$ on the conditions of an electric voltage control of 4.08 V in charge and an electric voltage control of 3 V in discharge. The results are shown in FIG. 4. As shown in FIG. 4, it was confirmed that the evaluation cell was so capable of being charged and discharged as to function as a secondary battery.

Reference Example

Figure 5:
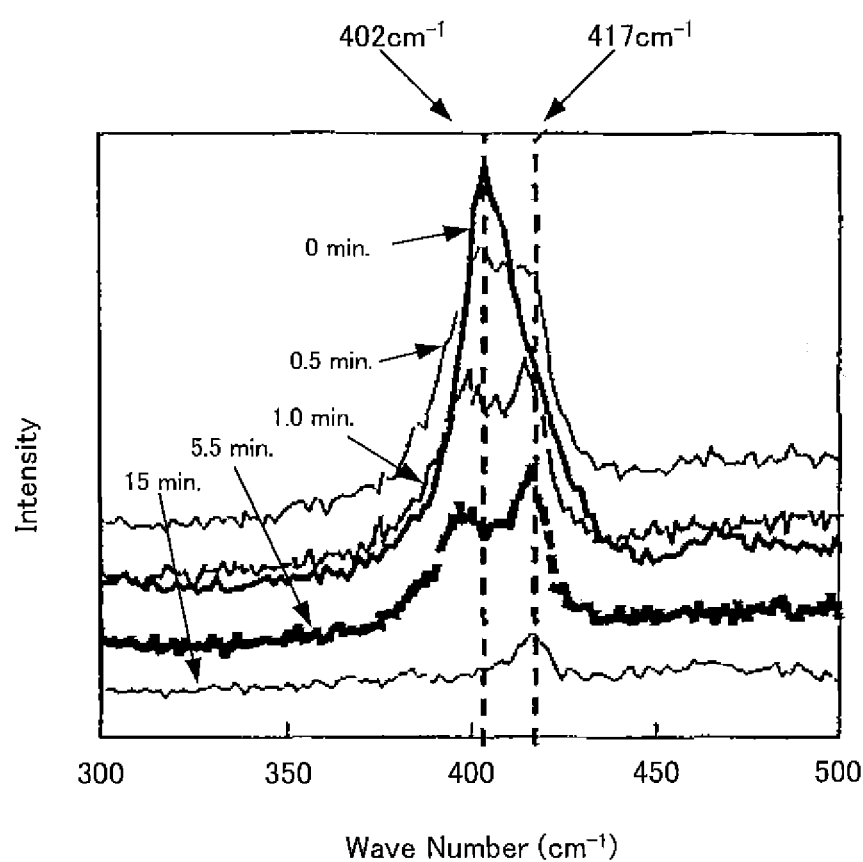
FIG. 5 is a graph showing a fluctuation of a Raman optical spectrum by atmospheric flow.

The fluctuation of a Raman optical spectrum by atmospheric flow was evaluated by using the sulfide solid electrolyte obtained in Comparative Example 1-7. The conditions of atmospheric flow were a temperature of 24° C., a humidity of 37% RH and a flow rate of 1 L/min. The Raman optical spectrum was measured at a timing of 0 minute, 0.5 minute, 1 minute, 5.5 minutes and 15 minutes. The results are shown in FIG. 5. In FIG. 5, a peak of 402 cm$^{-1}$ was a peak of the P$_2$S$_7$ unit and a peak of 417 cm$^{-1}$ was a peak of the PS$_4$ unit. As shown in FIG. 5, it was confirmed that the peak of the P$_2$S$_7$ unit (402 cm$^-$) decreased abruptly compare to the peak of the PS$_4$ unit (417 cm$^{-1}$) when the time for atmospheric flow became longer. It is conceived that the reason is that the P$_2$S$_7$ unit reacts preferentially with moisture in the atmosphere to cause hydrogen sulfide. In addition, in consideration of the structure of the P$_2$S$_7$ unit, it is suggested that sulfur located in a cross-linking portion reacts with moisture in the atmosphere. On the contrary, it is conceived that the sulfide solid electrolyte used for the present invention improves in stability against moisture by reason of having the P$_2$S$_6$O unit such that cross-linking sulfur of the P$_2$S$_7$ unit is substituted with oxygen. As a result, even in the case of assembling the battery in an atmosphere with a high dew-point temperature, the lithium ion conductance may be restrained from deteriorating.

The invention claimed is:

1. A method for producing an all solid lithium battery, comprising the steps of:
   preparing a material composition by adding Li$_2$S, P$_2$S$_5$, and P$_2$O$_5$ so as to satisfy a relation of (Li$_2$S)/(P$_2$S$_5$+P$_2$O$_5$)<3 on a molar basis;
   synthesizing a sulfide solid electrolyte from the material composition by a vitrification means; and
   assembling an all solid lithium battery in an atmosphere having a dew-point temperature of −40° C. or more while using the sulfide solid electrolyte.

2. The method for producing an all solid lithium battery according to claim 1, wherein the battery assembly step is performed in an atmosphere having a dew-point temperature of −30° C. or less.

3. The method for producing an all solid lithium battery according to claim 1, wherein the sulfide solid electrolyte is used as a solid electrolyte membrane disposed between a cathode active material layer and an anode active material layer.

4. The method for producing an all solid lithium battery according to claim 1, wherein the vitrification means is a mechanical milling.

5. The method for producing an all solid lithium battery according to claim 1, wherein the material composition satisfies a relation of (Li$_2$S)/(P$_2$S$_5$+P$_2$O$_5$)=7/3 on a molar basis.

6. The method for producing an all solid lithium battery according to claim 1, wherein the material composition satisfies a relation of (P$_2$O$_5$)/(Li$_2$S+P$_2$S$_5$+P$_2$O$_5$)≤10 on a molar basis.

7. The method for producing an all solid lithium battery according to claim 1, wherein the battery assembly step is performed in an inert gas atmosphere.

* * * * *